(12) United States Patent
Nobata et al.

(10) Patent No.: US 9,287,741 B2
(45) Date of Patent: Mar. 15, 2016

(54) STATOR FOR ROTATING ELECTRIC MACHINE

(71) Applicant: DENSO CORPORATION, Kariya, Aichi-pref. (JP)

(72) Inventors: Kazuhiro Nobata, Chiryu (JP); Toshiaki Oohara, Okazaki (JP); Youzou Matsui, Toyota (JP); Yoshiyasu Kozaki, Ichinomiya (JP); Hiroyuki Ikuta, Anjo (JP)

(73) Assignee: DENSO CORPORATION, Kariya (JP)

( * ) Notice: Subject to any disclaimer, the term of this patent is extended or adjusted under 35 U.S.C. 154(b) by 81 days.

(21) Appl. No.: 14/293,235

(22) Filed: Jun. 2, 2014

(65) Prior Publication Data

US 2014/0354108 A1 Dec. 4, 2014

(30) Foreign Application Priority Data

Jun. 4, 2013 (JP) ................................. 2013-117512

(51) Int. Cl.
| | |
|---|---|
| *H02K 1/18* | (2006.01) |
| *H02K 15/14* | (2006.01) |
| *H02K 1/14* | (2006.01) |
| *H02K 1/16* | (2006.01) |

(52) U.S. Cl.
CPC ................ *H02K 1/185* (2013.01); *H02K 15/14* (2013.01); *H02K 1/148* (2013.01); *H02K 1/16* (2013.01)

(58) Field of Classification Search
USPC ..................... 310/216.134, 216.135, 216.131, 310/216.132, 216.133, 216.124, 216.128, 310/216.129
See application file for complete search history.

(56) References Cited

U.S. PATENT DOCUMENTS

| | | | | |
|---|---|---|---|---|
| 5,796,190 | A  * | 8/1998 | Takeda et al. .................... 310/58 |
| 7,397,163 | B2 * | 7/2008 | Cook et al. ............. 310/216.051 |
| 7,737,597 | B2 * | 6/2010 | Jajtic et al. ............. 310/216.008 |
| 2010/0320865 | A1 * | 12/2010 | Bauch et al. ........... 310/216.134 |
| 2012/0175996 | A1 | 7/2012 | Ikuta et al. |

FOREIGN PATENT DOCUMENTS

JP      2012-161237      8/2012

* cited by examiner

*Primary Examiner* — Naishadh Desai
(74) *Attorney, Agent, or Firm* — Nixon & Vanderhye PC (57) ABSTRACT

A stator includes a hollow cylindrical stator core comprised of a plurality of stator core segments and an outer cylinder fitted on the radially outer surface of the stator core. The stator core has a recess formed in the radially outer surface and the recess has an engaging wall surface that extends in both the axial and radial directions of the stator core. The outer cylinder has a fastening portion for fastening the outer cylinder to the stator core. The fastening portion is formed to be partially surrounded by a plurality of first slits and a second slit. The fastening portion is bent radially inward to have a second slit-side end part thereof received in the recess of the stator core. Further, the second slit-side end part of the fastening portion has a distal end engaging with the engaging wall surface of the recess of the stator core.

9 Claims, 10 Drawing Sheets

STATOR FOR ROTATING ELECTRIC MACHINE

CROSS-REFERENCE TO RELATED APPLICATION

This application is based on and claims priority from Japanese Patent Application No. 2013-117512, filed on Jun. 4, 2013, the content of which is hereby incorporated by reference in its entirety into this application.

BACKGROUND

1 Technical Field

The present invention relates to stators for rotating electric machines that are used in, for example, motor vehicles as electric motors and electric generators.

2 Description of Related Art

Conventionally, there are known stators for rotating electric machines which include a hollow cylindrical stator core, a stator coil and an outer cylinder. The stator core is comprised of a plurality of stator core segments that are arranged in the circumferential direction of the stator core to adjoin one another in the circumferential direction. Further, to reduce iron loss of the stator, each of the stator core segments is formed by laminating a plurality of steel sheets in the axial direction of the stator core. The stator coil is mounted on the stator core. The outer cylinder is fitted on the radially outer surfaces of the stator core segments so as to fasten them together.

Moreover, Japanese Unexamined Patent Application Publication No. 2012-161237 discloses a method of preventing relative circumferential movement (or relative rotation) between the outer cylinder and the stator core.

Specifically, according to the method, the outer cylinder has a slit and a fastening portion for fastening the outer cylinder to the stator core. The slit radially penetrates the outer cylinder to connect the radially outer and inner surfaces of the outer cylinder. The fastening portion is formed to adjoin the slit. In manufacturing the stator, after the outer cylinder is fitted onto the radially outer surface of the stator core (or the radially outer surfaces of the stator core segments), at least part of the fastening portion of the outer cylinder is plastically deformed radially inward into a recess formed in the radially outer surface of the stator core, thereby engaging with the recess. Consequently, with the engagement between the at least part of the fastening portion of the outer cylinder and the recess of the stator core, the outer cylinder and the stator core are prevented from circumferentially moving (or rotating) relative to each other.

Further, after the at least part of the fastening portion of the outer cylinder is plastically deformed radially inward into the recess of the stator core, a radial gap may be formed between the at least part of the fastening portion and a wall surface of the recess due to springback of the fastening portion. Therefore, to prevent formation of such a radial gap, the method further includes, before the step of fitting the outer cylinder onto the radially outer surface of the stator core, a preliminary bending step in which the at least part of the fastening portion of the outer cylinder is bent radially inward by a predetermined amount.

However, with the at least part of the fastening portion of the outer cylinder bent in the preliminary bending step, the outer cylinder is press-fitted onto the radially outer surface of the stator core in the subsequent fitting step. That is, the outer cylinder axially slides on the radially outer surfaces of the stator core segments in the fitting step. Consequently, the steel sheets forming the stator core segments may be axially separated from one another by the axial sliding of the outer cylinder on the radially outer surfaces of the stator core segments.

In addition, with the preliminary bending step, the number of steps of the method is increased, thereby lowering the productivity and increasing the manufacturing cost of the stator.

SUMMARY

According to an exemplary embodiment, there is provided a stator for a rotating electric machine. The stator includes a hollow cylindrical stator core, a stator coil and an outer cylinder. The stator core is comprised of a plurality of stator core segments that are arranged in a circumferential direction of the stator core to adjoin one another in the circumferential direction. The stator coil is mounted on the stator core. The outer cylinder is fitted on a radially outer surface of the stator core. The stator core has a recess formed in the radially outer surface thereof. The recess has an engaging wall surface that extends in both an axial direction and a radial direction of the stator core. The outer cylinder has a plurality of first slits and a second slit, all of which radially penetrate the outer cylinder to connect radially outer and inner surfaces of the outer cylinder. The first slits extend in the circumferential direction of the stator core and are spaced from one another in the axial direction of the stator core. The second slit extends in the axial direction of the stator core to connect the first slits. The outer cylinder also has a fastening portion for fastening the outer cylinder to the stator core. The fastening portion is formed to be partially surrounded by the first and second slits. Moreover, the fastening portion is bent radially inward to have a second slit-side end part thereof received in the recess of the stator core. Further, the second slit-side end part of the fastening portion has a distal end engaging with the engaging wall surface of the recess of the stator core.

With the above configuration, it is possible to easily and reliably fasten the outer cylinder and the stator core together without performing a preliminary bending step as disclosed in Japanese Unexamined Patent Application Publication No. 2012-161237.

In a further implementation, the fastening portion is located on the stator core so that before the bending of the fastening portion radially inward, the second slit-side end part of the fastening portion protrudes circumferentially toward the opposite side to the recess of the stator core by a predetermined amount from a reference line; the reference line is defined to extend through both a longitudinal axis of the stator core and an intersection between the radially outer surface of the stator core and the engaging wall surface of the recess.

The distal end of the second slit-side end part of the fastening portion of the outer cylinder is kept in pressed contact with the engaging wall surface of the recess of the stator core by springback of the second slit-side end part.

The engaging wall surface of the recess of the stator core is positioned closer to the distal end of the second slit-side end part of the fastening portion of the outer cylinder than to a bending start point of the fastening portion.

On a distal end surface of the second slit-side end part of the fastening portion, there may be formed a protrusion that protrudes circumferentially toward the opposite side to the recess of the stator core before the bending of the fastening portion radially inward.

Alternatively, the distal end surface of the second slit-side end part of the fastening portion may be configured to include at least one of first and second oblique surfaces. The first oblique surface faces radially inward and circumferentially toward the opposite side to the recess of the stator core before the bending of the fastening portion radially inward. The second oblique surface faces radially outward and circumferentially toward the opposite side to the recess of the stator core before the bending of the fastening portion radially inward.

The fastening portion of the outer cylinder may be a first fastening portion and the engaging wall surface may be a first engaging wall surface that engages with the distal end of the second slit-side end part of the first fastening portion. The outer cylinder may also have a second fastening portion for fastening the outer cylinder to the stator core; the second fastening portion is formed in the same manner as the first fastening portion to have a second slit-side end part with a distal end; the distal ends of the second slit-side end parts of the first and second fastening portions facing respectively toward opposite circumferential sides. In the stator core, there may be also formed a second engaging wall surface in the same manner as the first engaging wall surface; the second engaging wall surface engages with the distal end of the second slit-side end part of the second fastening portion of the outer cylinder.

Further, both the first and second engaging wall surfaces may be formed in a same one of the stator core segments.

Alternatively, the first and second engaging wall surfaces may be formed respectively in two different ones of the stator core segments.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
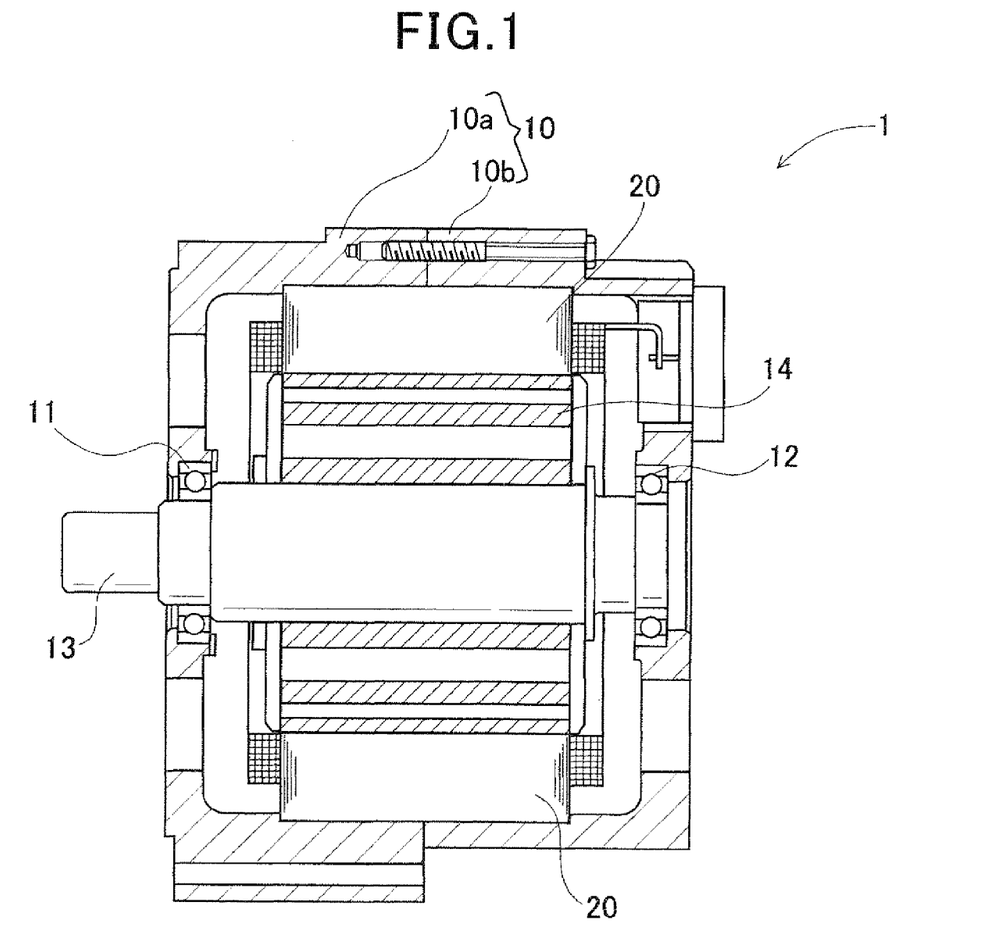
FIG. 1 is a schematic, partially cross-sectional view of a rotating electric machine which includes a stator according to an embodiment.

FIG. 1 shows the overall configuration of a rotating electric machine 1 which includes a stator 20 according to an embodiment.

In the present embodiment, the rotating electric machine 1 is configured as an electric motor for use in a motor vehicle.

As shown in FIG. 1, the rotating electric machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 to face the radially inner periphery of the stator 20. The polarities of the magnetic poles alternate between north and south in the circumferential direction of the rotor 14. The number of the magnetic poles can be suitably set according to the design specification of the rotating electric machine 1. In the present embodiment, the number of the magnetic poles is set to be equal to, for example, eight (i.e., four north poles and four south poles).

Referring now to FIGS. 2-8, the stator 20 includes a hollow cylindrical stator core 30, a three-phase stator coil 40 mounted on the stator core 30, and an outer cylinder 50. In addition, the stator 20 may further have insulating paper interposed between the stator core 30 and the stator coil 40.

Figure 3:
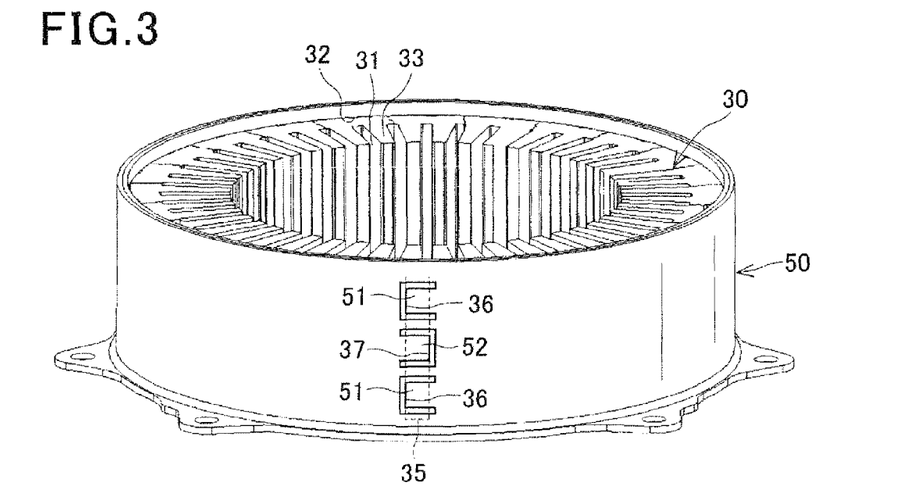
FIG. 3 is a perspective view of the stator omitting a stator coil of the stator.

The stator core 30 has, as shown in FIG. 3, a plurality of slots 31 that are formed in the radially inner surface of the stator core 30 and spaced in the circumferential direction of the stator core 30 at predetermined intervals. For each of the slots 31, the depth direction of the slot 31 is coincident with a radial direction of the stator core 30. In the present embodiment, there are provided two slots 31 per magnetic pole of the rotor 14 that has the eight magnetic poles and per phase of the three-phase stator coil 40. Accordingly, the total number of the slots 31 formed in the stator core 30 is equal to 48 (i.e., 2×8×3).

In the slots 31 of the stator core 30, there are received in-slot portions of electric wires 45 that make up the stator coil 40. In the present embodiment, in each of the slots 31, there are received the in-slot portions of twelve electric wires 45 in radial alignment with each other.

Moreover, in the present embodiment, the stator core 30 is comprised of, for example, 24 stator core segments 32. The stator core segments 32 are arranged in the circumferential direction of the stator core 30 so as to adjoin one another in the circumferential direction.

Figure 5:
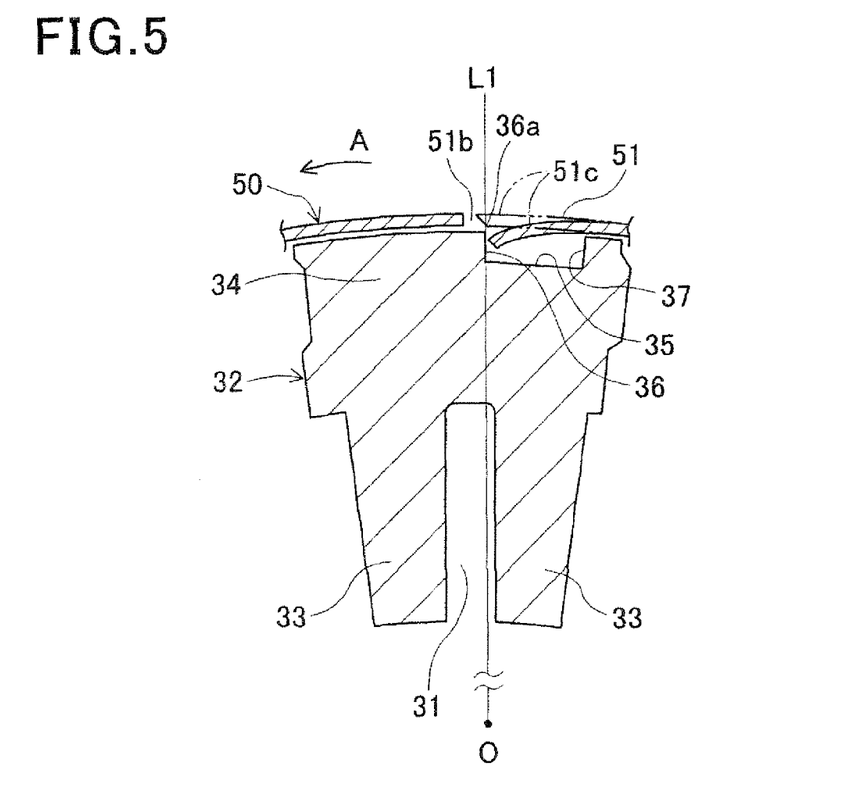
FIG. 5 is a cross-sectional view taken along the line V-V in FIG. 4.
Figure 7:
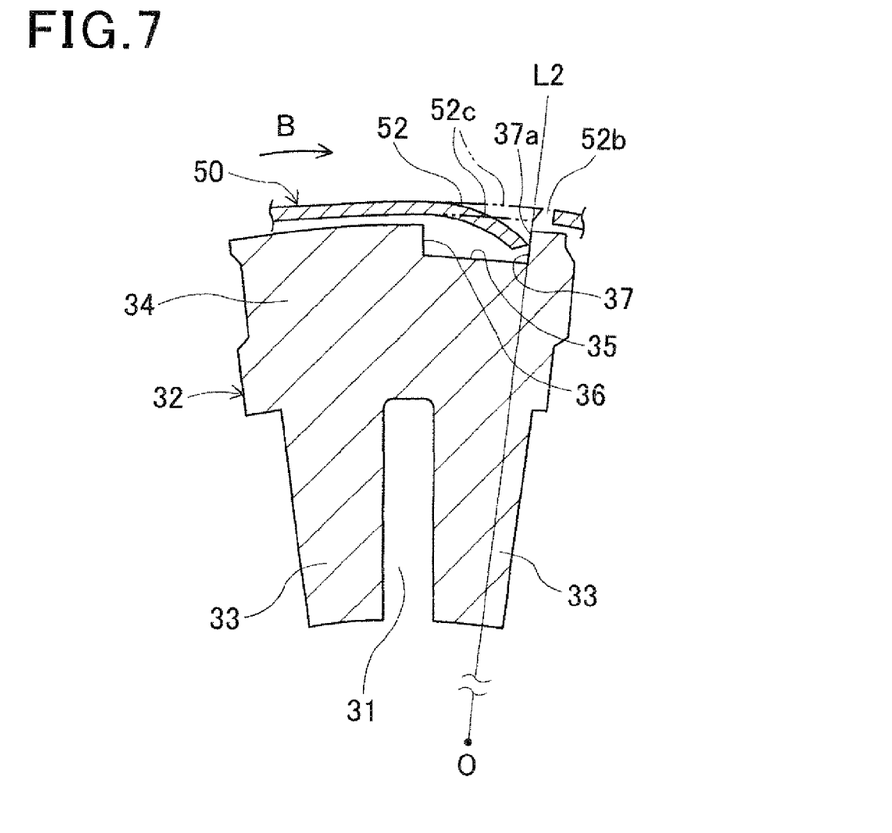
FIG. 7 is a cross-sectional view taken along the line VII-VII in FIG. 4.

As shown in FIGS. 5 and 7, each of the stator core segments 32 defines therein one of the slots 31. Moreover, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is positioned radially outside the tooth portions 33 to connect them. In addition, all the back core portions 34 of the stator core segments 32 together make up a back core portion 34 of the stator core 30.

In the present embodiment, each of the stator core segments 32 is formed by laminating a plurality of magnetic steel sheets in the axial direction of the stator core 30. The magnetic steel sheets are formed by, for example, blanking and fixed together by, for example, staking.

Moreover, in the present embodiment, the stator core 30 has a recess 35 formed in the radially outer surface of one of the stator core segments 32. As will be described in detail later, the recess 35 is provided for engaging with a pair of first fastening portions 51 and a second fastening portion 52 of the outer cylinder 50.

The recess 35 is in the form of a groove that extends in the axial direction of the stator core 30 with a predetermined circumferential width. The longitudinal ends of the recess 35 are respectively close to the axial ends of the stator core 30. In addition, as shown in FIGS. 5 and 7, the recess 35 is positioned in the circumferential direction of the stator core 30 so as to be radially aligned with one of the tooth portions 33 of the stator core segment 32.

At one circumferential end (i.e., the left end in FIGS. 5-8) of the recess 35, there is formed a first engaging wall surface 36 for engaging with the pair of first fastening portions 51 of the outer cylinder 50. The first engaging wall surface 36 extends in both the axial direction and a radial direction of the stator core 30. Moreover, the first engaging wall surface 36 coincides with (or extends along) a first reference line L1 that is defined to extend through both a longitudinal axis O of the stator core 30 and an intersection 36a between the radially outer surface of the stator core 30 and the first engaging wall surface 36.

At the other circumferential end (i.e., the right end in FIGS. 5-8) of the recess 35, there is formed a second engaging wall surface 37 for engaging with the second fastening portion 52 of the outer cylinder 50. The second engaging wall surface 37 extends in both the axial direction and a radial direction of the stator core 30. Moreover, the second engaging wall surface 37 coincides with (or extends along) a second reference line L2 that is defined to extend through both the longitudinal axis O of the stator core 30 and an intersection 37a between the radially outer surface of the stator core 30 and the second engaging wall surface 37.

The stator coil 40 is formed of a plurality (e.g., 12 in the present embodiment) of wave-shaped electric wires 45 to have, as a whole, a hollow cylindrical shape. More specifically, the stator coil 40 is formed by first stacking the electric wires 45 to form a flat band-shaped electric wire assembly and then spirally rolling the flat band-shaped electric wire assembly by, for example, six turns into the hollow cylindrical shape.

Moreover, after the assembly of the stator core 30 and the stator coil 40, each of the electric wires 45 forming the stator coil 40 includes a plurality of in-slot portions and a plurality of turn portions. Each of the in-slot portions is received in a corresponding one of the slots 31 of the stator core 30. Each of the turn portions is located outside the slots 31 of the stator core 30 to connect a corresponding pair of the in-slot portions of the electric wire 45 which are respectively received in two different ones of the slots 31 of the stator core 30.

More specifically, in the present embodiment, the stator core 30 and the hollow cylindrical stator coil 40 are assembled by inserting the tooth portions 33 of the stator core segments 32 respectively into the spaces formed between stacks of the in-slot portions of the electric wires 45 from the radially outside of the stator coil 40; each of the stacks includes a predetermined number (e.g., 12) of the in-slot portions of the electric wires 45 which are radially aligned with each other. Consequently, for each of the electric wires 45, the in-slot portions of the electric wire 45 are received in corresponding slots 31 of the stator core 30 which are circumferentially spaced from one another at, for example, a six-slot pitch (i.e., 3 (the number of phases)×2 (the slot multiplier number)=6). Moreover, as shown in FIG. 2, all the turn portions of the electric wires 45 together make up a pair of coil ends 42 of the stator coil 40 which respectively protrude from opposite axial end faces 30a of the stator core 30.

The outer cylinder 50 is fitted on the radially outer surfaces of the stator core segments 32 so as to fasten the stator core segments 32 together and thereby keep the hollow cylindrical shape of the stator core 30. In addition, all the radially outer surfaces of the stator core segments 32 together make up the radially outer surface of the stator core 30.

Figure 2:
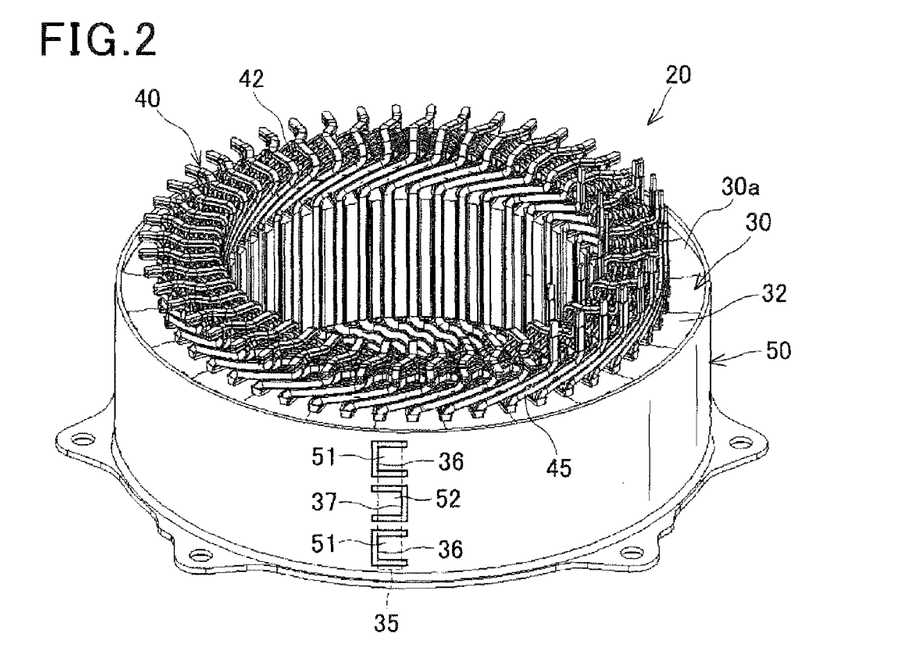
FIG. 2 is a perspective view of the stator.
Figure 4:
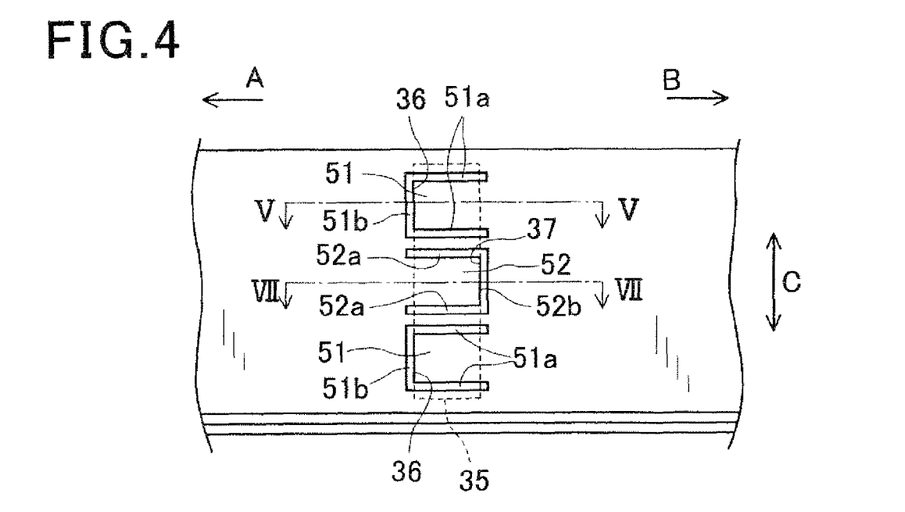
FIG. 4 is a side view of part of an outer cylinder of the stator.

Specifically, in the present embodiment, as shown in FIGS. 2-4, the outer cylinder 50 has the pair of first fastening portions 51 and the second fastening portion 52 formed at one spot in the circumferential direction.

Each of the first fastening portions 51 is formed to be partially surrounded by a substantially U-shaped slit that is comprised of a pair of first slits 51a and a second slit 51b. Each of the first and second slits 51a and 51b radially penetrates the outer cylinder 50 to connect the radially outer and inner surfaces of the outer cylinder 50. Moreover, the first slits 51a both extend in the circumferential direction (i.e., the direction indicated with the single-headed arrows A and B in FIG. 4) of the outer cylinder 50 and are spaced from each other in the axial direction (i.e., the direction indicated with the double-headed arrow C in FIG. 4). The second slit 51b extends in the axial direction of the outer cylinder 50 to connect ends of the first slits 51a on a first circumferential side (i.e., the left side in FIG. 4).

On the other hand, the second fastening portion 52 is formed to be partially surrounded by a substantially U-shaped slit that is comprised of a pair of first slits 52a and a second slit 52b. Each of the first and second slits 52a and 52b radially penetrates the outer cylinder 50 to connect the radially outer and inner surfaces of the outer cylinder 50. Moreover, the first slits 52a both extend in the circumferential direction of the outer cylinder 50 and are spaced from each other in the axial direction. The second slit 52b extends in the axial direction of the outer cylinder 50 to connect ends of the first slits 52a on a second circumferential side (i.e., the right side in FIG. 4) which is opposite to the first circumferential side.

Moreover, in the present embodiment, the second fastening portion 52 is formed at an axially central portion of the outer cylinder 50. The first fastening portions 51 are formed respectively at opposite axial end portions of the outer cylinder 50 so as to have the second fastening portion 52 interposed therebetween. That is, all the first and second fastening portions 51 and 52 are formed in the outer cylinder 50 in axial alignment with each other. Consequently, it becomes possible to minimize the circumferential width of the recess 35 which is formed in the radially outer surface of the one of the stator core segments 32 for engaging with all the first and second fastening portions 51 and 52 of the outer cylinder 50.

Figure 6:
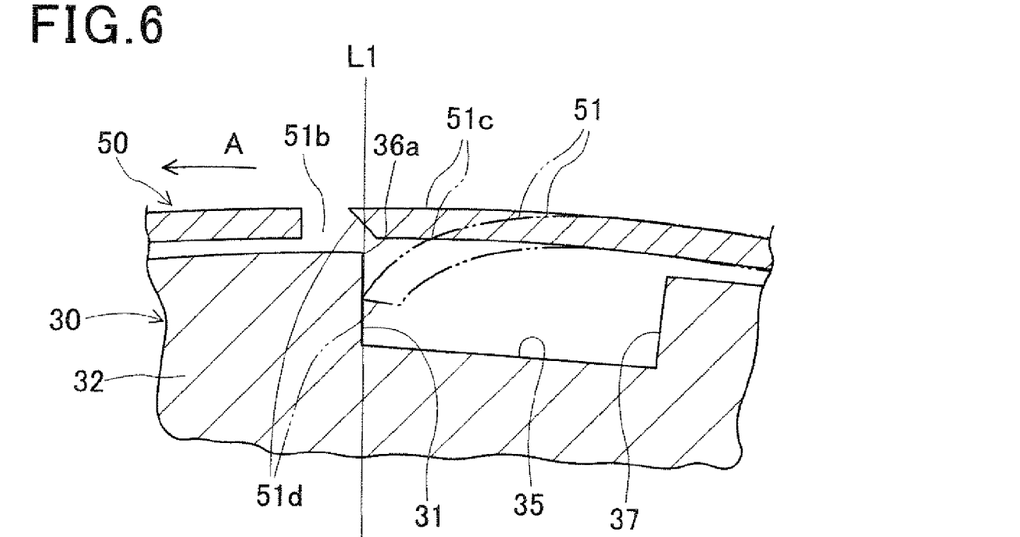
FIG. 6 is an enlarged view of part of FIG. 5 illustrating a first fastening portion of the outer cylinder.

In the present embodiment, as shown in FIGS. 5-6, for each of the first fastening portions 51, a distal end surface of a second slit-side end part 51c of the first fastening portion 51 is configured as a first oblique surface 51d. The first oblique surface 51d faces radially inward and circumferentially toward the opposite side to the recess 35 (i.e., toward the side indicated with the arrow A in FIGS. 5-6) before the pressing of the second slit-side end part 51c into the recess 35. In other words, the distance between the first oblique surface 51d and the recess 35 increases in the radially outward direction before the pressing of the second slit-side end part 51c into the recess 35. Moreover, before being pressed into the recess 35, the second slit-side end part 51c is located on the stator core 30 so as to protrude circumferentially toward the opposite side to the recess 35 by a predetermined amount from the first reference line L1. Consequently, after being pressed into the recess 35, the second slit-side end part 51c has its distal end engaging with the first engaging wall surface 36 of the recess 35.

Furthermore, in the state of engaging with the first engaging wall surface 36 of the recess 35, the distal end of the second slit-side end part 51c is kept in pressed contact with the first engaging wall surface 36 by springback of the second slit-side end part 51c. Consequently, with the pressed contact between the distal end of the second slit-side end part 51c and the first engaging wall surface 36 of the recess 35, the outer cylinder 50 is prevented from rotating relative to the stator core 30 in the circumferential direction toward the opposite side of the first engaging wall surface 36 to the distal end of the second slit-side end part 51c. That is, the outer cylinder 50 is prevented from rotating relative to the stator core 30 in the circumferential direction indicated with the arrow A in FIGS. 4-6.

Figure 8:
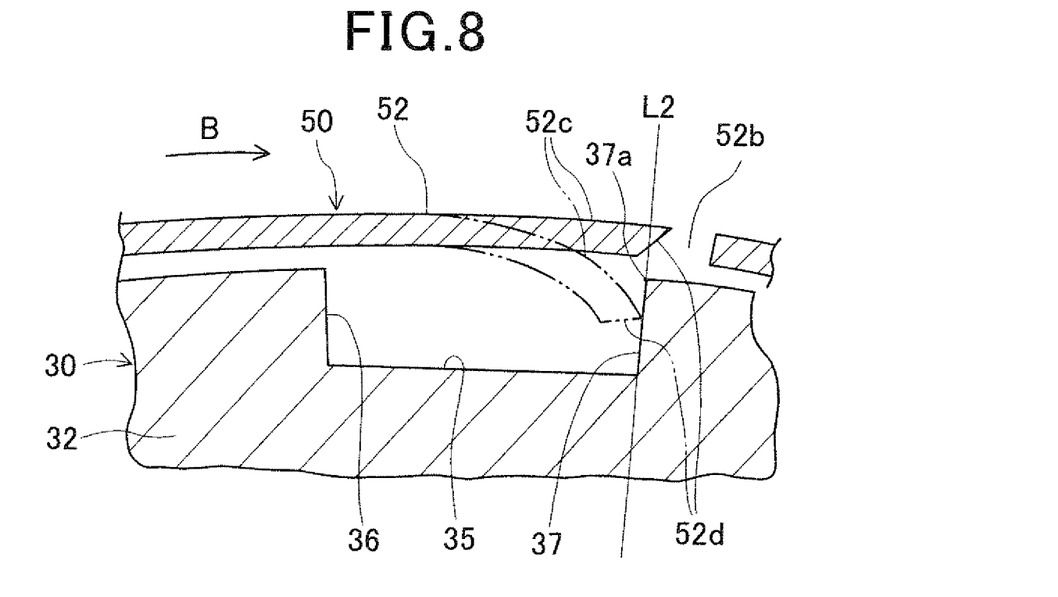
FIG. 8 is an enlarged view of part of FIG. 7 illustrating a second fastening portion of the outer cylinder.

Similarly, as shown in FIGS. 7-8, a distal end surface of the second slit-side end part 52c of the second fastening portion 52 is configured as a first oblique surface 52d. The first oblique surface 52d faces radially inward and circumferentially toward the opposite side to the recess 35 (i.e., toward the side indicated with the arrow B in FIGS. 7-8) before the pressing of the second slit-side end part 52c into the recess 35. In other words, the distance between the first oblique surface 52d and the recess 35 increases in the radially outward direction before the pressing of the second slit-side end part 52c into the recess 35. Moreover, before being pressed into the recess 35, the second slit-side end part 52c is located on the stator core 30 so as to protrude circumferentially toward the opposite side to the recess 35 by a predetermined amount from the second reference line L2. Consequently, after being pressed into the recess 35, the second slit-side end part 52c has its distal end engaging with the second engaging wall surface 37 of the recess 35.

Furthermore, in the state of engaging with the second engaging wall surface 37 of the recess 35, the distal end of the second slit-side end part 52c is kept in pressed contact with the second engaging wall surface 37 by springback of the second slit-side end part 52c. Consequently, with the pressed contact between the distal end of the second slit-side end part 52c and the second engaging wall surface 37 of the recess 35, the outer cylinder 50 is prevented from rotating relative to the stator core 30 in the circumferential direction toward the opposite side of the second engaging wall surface 37 to the distal end of the second slit-side end part 52c. That is, the outer cylinder 50 is prevented from rotating relative to the stator core 30 in the circumferential direction indicated with the arrow B in FIGS. 4 and 7-8.

Next, a method of manufacturing the stator 20 according to the present embodiment will be described with reference to FIGS. 9-11.

Figure 9:
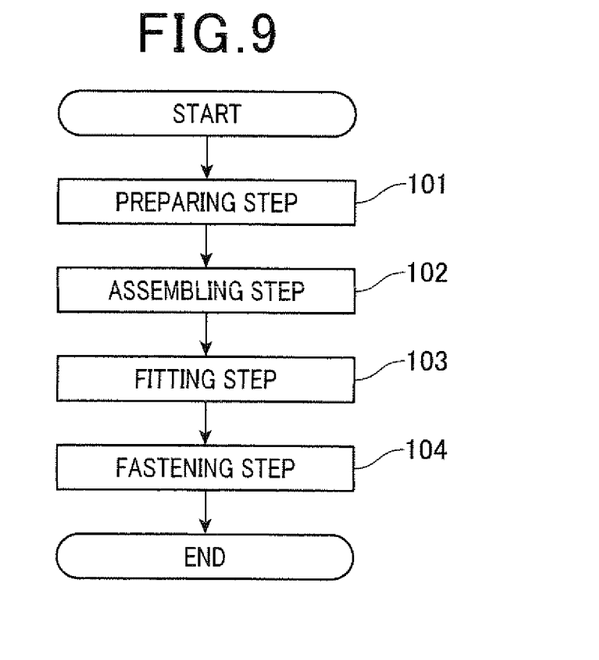
FIG. 9 is a flow chart illustrating a method of manufacturing the stator according to the embodiment.

As shown in FIG. 9, the method according to the present embodiment includes a preparing step 101, an assembling step 102, a fitting step 103, and a fastening step 104.

In the preparing step 101, the stator core segments 32 (i.e., the stator core 30), the hollow cylindrical stator coil 40, and the outer cylinder 50 are prepared.

In addition, one of the stator core segments 32 prepared in this step has the recess 35 formed in the radially outer surface thereof. On the other hand, the outer cylinder 50 prepared in this step has the first and second slits 51a-51b and 52a-52b and the first and second fastening portions 51 and 52 formed therein (see FIGS. 10(a) and 11(a)).

In the assembling step 102, the stator core 30 is assembled to the hollow cylindrical stator coil 40.

Specifically, in this step, the tooth portions 33 of the stator core segments 32 are respectively inserted into the spaces formed between stacks of the in-slot portions of the electric wires 45 from the radially outside of the stator coil 40; each of the stacks includes the predetermined number of radially-aligned in-slot portions of the electric wires 45.

Consequently, the stator core segments 32 are placed together to make up the hollow cylindrical stator core 30. The in-slot portions of the electric wires 45 that form the stator coil 40 are respectively received in the corresponding slots 31 of the stator core 30. On the other hand, all the turn portions of the electric wires 45 together make up the pair of coil ends 42 of the stator coil 40 which respectively protrude from opposite axial end faces 30a of the stator core 30.

In the fitting step 103, the outer cylinder 50 is axially fitted onto the radially outer surface of the stator core 30. Consequently, as shown in FIG. 10(b), for each of the first fastening portions 51 of the outer cylinder 50, the second slit-side end part 51c of the first fastening portion 51 is located on the stator core 30 so as to protrude circumferentially toward the opposite side to the recess 35 by the predetermined amount from the first reference line L1. Moreover, as shown in FIG. 11(b), the second slit-side end part 52c of the second fastening portion 52 of the outer cylinder 50 is located on the stator core 30 so as to protrude circumferentially toward the opposite side to the recess 35 by the predetermined amount from the second reference line L2.

In addition, the predetermined amounts, by which the second slit-side end parts 51c and 52c of the first and second fastening portions 51 and 52 of the outer cylinder 50 respectively protrude from the first and second reference lines L1 and L2, can be suitably set so as to: allow the second slit-side end parts 51c and 52c to be easily pressed into the recess 35 without being damaged; and prevent the second slit-side end parts 51c and 52c from being easily ejected from the recess 35 by the springback thereof.

In the fastening step 104, the outer cylinder 50 and the stator core 30 are fastened together.

Figure 10:
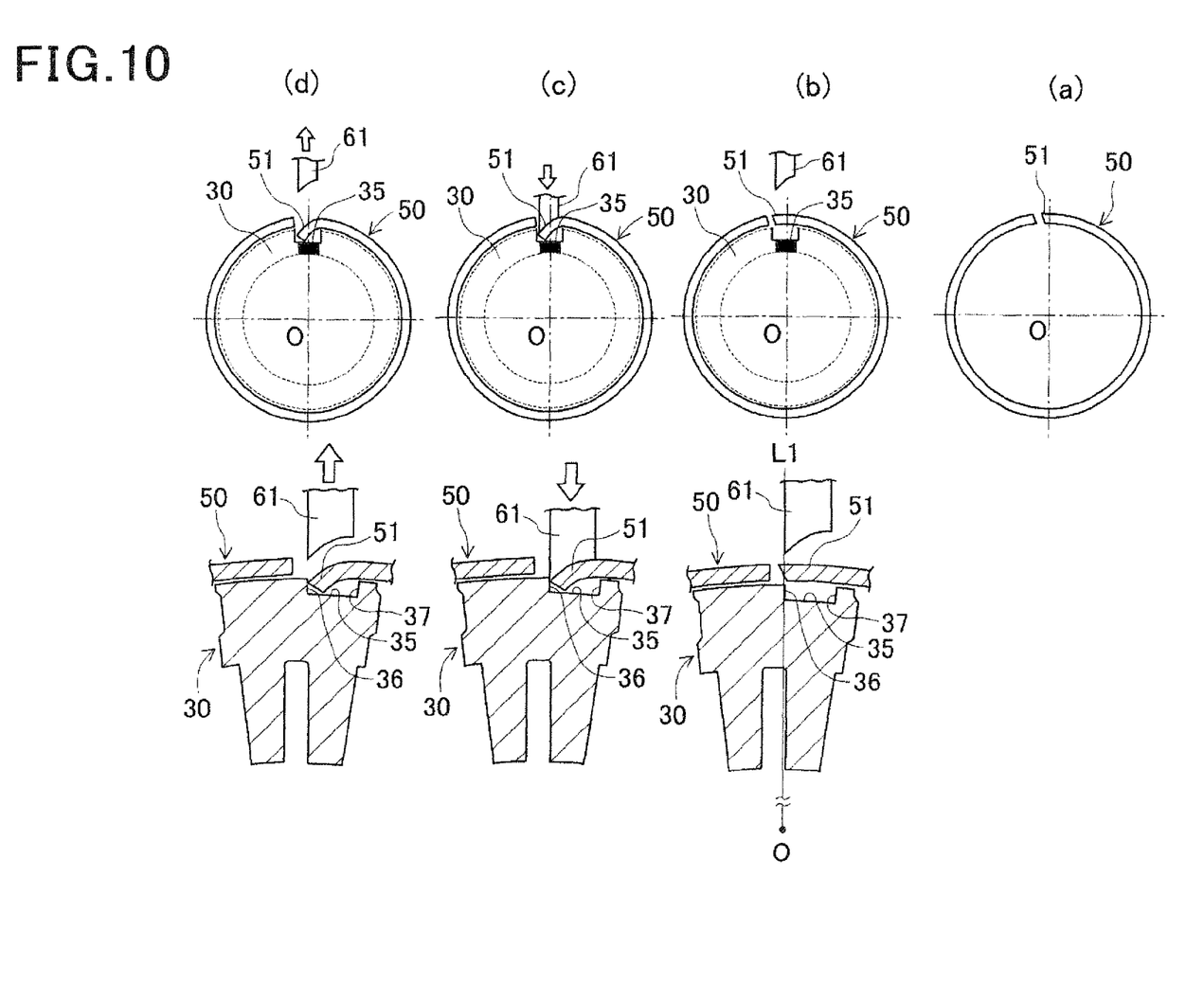
FIG. 10 is a schematic view illustrating the method of manufacturing the stator, wherein (a) illustrates the outer cylinder prepared in a preparing step of the method, (b) illustrates the first fastening portion of the outer cylinder immediately before being pressed by a first punch in a fastening step of the method, (c) illustrates the first fastening portion of the outer cylinder being pressed by the first punch in the fastening step, and (d) illustrates the first fastening portion of the outer cylinder after the removal of the first punch from the first fastening portion in the fastening step.

Specifically, in this step, as shown in FIG. 10(c), for each of the first fastening portions 51 of the outer cylinder 50, the second slit-side end part 51c of the first fastening portion 51 is pressed by a first punch (or pressing member) 61 into the recess 35, thereby bringing the distal end of the second slit-side end part 51c into engagement with the first engaging wall surface 36 of the recess 35. At the same time, as shown in FIG. 11(c), the second slit-side end part 52c of the second fastening portion 52 of the outer cylinder 50 is pressed by a second punch (or pressing member) 62 into the recess 35, thereby bringing the distal end of the second slit-side end part 52c into engagement with the second engaging wall surface 37 of the recess 35.

In other words, in this step, each of the first fastening portions 51 of the outer cylinder 50 is bent radially inward by the first punch 61 to have the second slit-side end part 51c thereof received in the recess 35 of the stator core 30; consequently, the distal end of the second slit-side end part 51c is brought into engagement with the first engaging wall surface 36 which is positioned closer to the distal end of the second slit-side end part 51c than to the bending start point of the first fastening portion 51. Similarly, the second fastening portion 52 of the outer cylinder 50 is bent radially inward by the second punch 62 to have the second slit-side end part 52c thereof received in the recess 35 of the stator core 30; consequently, the distal end of the second slit-side end part 52c is brought into engagement with the second engaging wall surface 37 which is positioned closer to the distal end of the second slit-side end part 52c than to the bending start point of the second fastening portion 52.

In addition, as described previously, in the present embodiment, the distal end surfaces of the second slit-side end parts 51c and 52c of the first and second fastening portions 51 and 52 of the outer cylinder 50 are respectively configured as the first oblique surfaces 51d and 52d. Consequently, in the fastening step 104, the second slit-side end parts 51c and 52c of the first and second fastening portions 51 and 52 can be easily and smoothly pressed into the recess 35.

Figure 11:
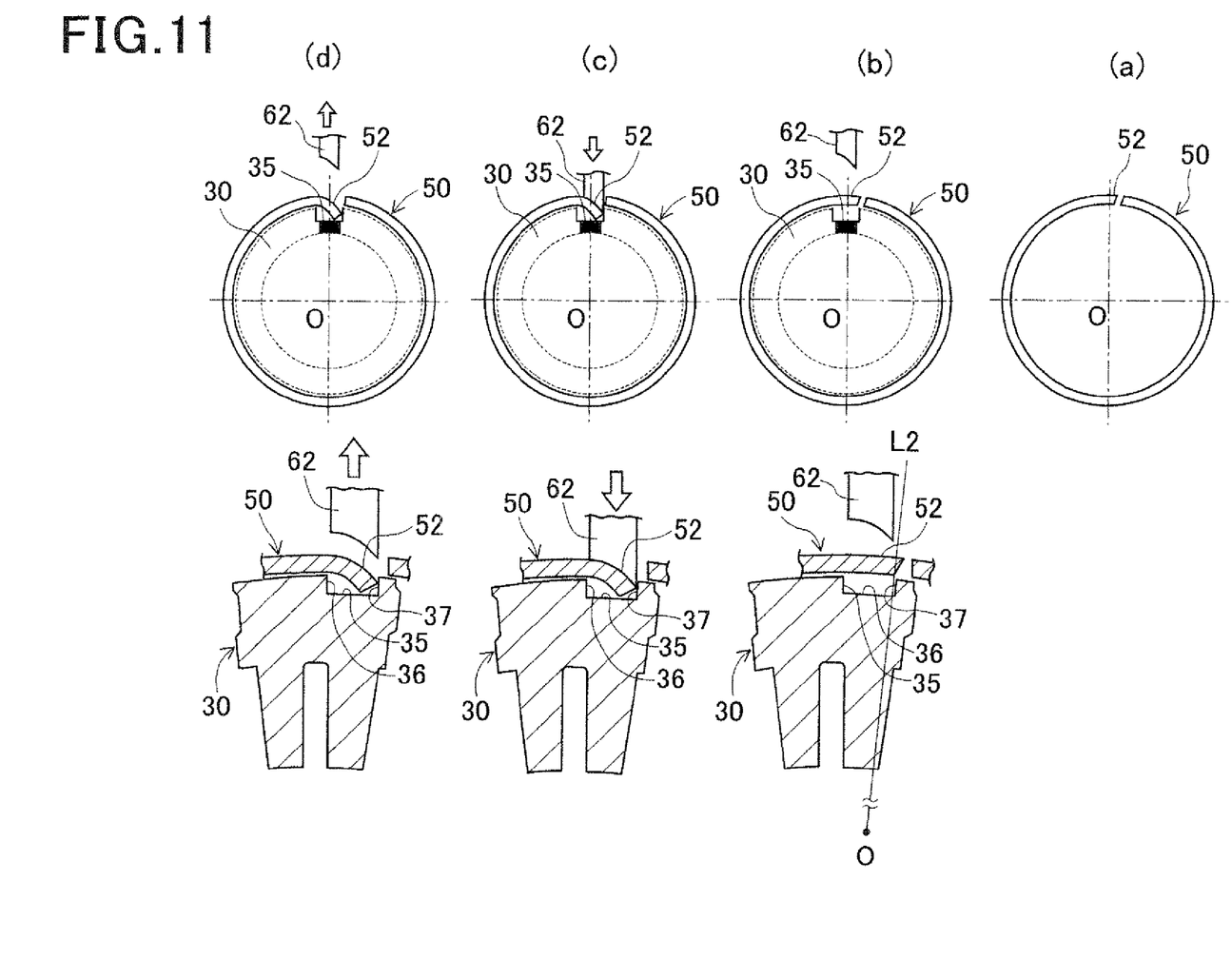
FIG. 11 is a schematic view also illustrating the method of manufacturing the stator, wherein (a) illustrates the outer cylinder prepared in the preparing step of the method, (b) illustrates the second fastening portion of the outer cylinder immediately before being pressed by a second punch in the fastening step of the method, (c) illustrates the second fastening portion of the outer cylinder being pressed by the second punch in the fastening step, and (d) illustrates the second fastening portion of the outer cylinder after the removal of the second punch from the second fastening portion in the fastening step.

Thereafter, as shown in FIGS. 10(d) and 11(d), the first and second punches 61 and 62 are removed from the outer cylinder 50, thereby releasing the first and second fastening portions 51 and 52 of the outer cylinder 50 from the pressing forces of the first and second punches 61 and 62.

Consequently, the distal ends of the second slit-side end parts 51c of the first fastening portions 51, which have been pressed into the recess 35 to engage with the first engaging wall surface 36 of the recess 35, are kept in pressed contact with the first engaging wall surface 36 by the springback of the second slit-side end parts 51c of the first fastening portions 51. As a result, the outer cylinder 50 is prevented from rotating relative to the stator core 30 in the circumferential direction indicated with the arrow A in FIGS. 4-6.

On the other hand, the distal end of the second slit-side end part 52c of the second fastening portion 52, which has been pressed into the recess 35 to engage with the second engaging wall surface 37 of the recess 35, is kept in pressed contact with the second engaging wall surface 37 by the springback of the second slit-side end part 52c of the second fastening portion 52. As a result, the outer cylinder 50 is prevented from rotating relative to the stator core 30 in the circumferential direction indicated with the arrow B in FIGS. 4 and 7-8.

That is, after the fastening step 104, the outer cylinder 50 and the stator core 30 are firmly fastened together so that the outer cylinder 50 is prevented from rotating relative to the stator core 30 in either of opposite circumferential directions of the stator core 30 (or in either the clockwise or the counterclockwise direction).

In addition, after the fastening step 104, finishing processes may be suitably performed for the assembly of the stator core 30, the stator coil 40 and the outer cylinder 50.

As a result, the stator 20 as shown in FIG. 2 is finally obtained.

The above-described stator 20 according to the present embodiment has the following advantages.

In the present embodiment, the stator 20 includes the hollow cylindrical stator core 30, the stator coil 40 and the outer cylinder 50. The stator core 30 is comprised of the stator core segments 32 that are arranged in the circumferential direction of the stator core 30 to adjoin one another in the circumferential direction. The stator coil 40 is mounted on the stator core 30. The outer cylinder 50 is fitted on the radially outer surface of the stator core 30. The stator core 30 has the recess 35 formed in the radially outer surface thereof. The recess 3 has the first and second engaging wall surfaces 36 and 37 each of which extends in both the axial and radial directions of the stator core 30. The outer cylinder 50 has the pair of first fastening portions 51 and the second fastening portion 52, all of which are provide for fastening the outer cylinder 50 to the stator core 30. Each of the first fastening portions 51 is formed to be partially surrounded by the pair of first slits 51a and the second slit 51b. Each of the first and second slits 51a and 51b radially penetrates the outer cylinder 50 to connect the radially outer and inner surfaces of the outer cylinder 50. Moreover, the first slits 51a both extend in the circumferential direction of the outer cylinder 50 (or the circumferential direction of the stator core 30) and are spaced from each other in the axial direction of the outer cylinder 50 (or the axial direction of the stator core 30). The second slit 51b extends in the axial direction of the outer cylinder 50 to connect the first slits 51a. Each of the first fastening portions 51 has the second slit-side end part 51c thereof pressed into the recess 35 of the stator core 30. In other words, each of the first fastening portions 51 is bent radially inward to have the second slit-side end part 51c thereof received in the recess 35 of the stator core 30. Further, the second slit-side end part 51c has its distal end engaging with the first engaging wall surface 36 of the recess 35 of the stator core 30. On the other hand, the second fastening portion 52 is formed to be partially surrounded by the pair of first slits 52a and the second slit 52b. Each of the first and second slits 52a and 52b radially penetrates the outer cylinder 50 to connect the radially outer and inner surfaces of the outer cylinder 50. Moreover, the first slits 52a both extend in the circumferential direction of the outer cylinder 50 and are spaced from each other in the axial direction of the outer cylinder 50. The second slit 52b extends in the axial direction of the outer cylinder 50 to connect the first slits 52a. The second fastening portion 52 has the second slit-side end part 52c thereof pressed into the recess 35 of the stator core 30. In other words, the second fastening portion 52 is bent radially inward to have the second slit-side end part 52c thereof received in the recess 35 of the stator core 30. Further, the second slit-side end part 52c has its distal end engaging with the second engaging wall surface 37 of the recess 35 of the stator core 30.

With the above configuration, for each of the first fastening portions 51, the distal end of the second slit-side end part 51c of the first fastening portion 51 is kept in pressed contact with the first engaging wall surface 36 of the recess 35 of the stator core 30 by the springback of the second slit-side end part 51c. Consequently, with the pressed contact between the distal end of the second slit-side end part 51c and the first engaging wall surface 36 of the recess 35, the outer cylinder 50 is prevented from rotating relative to the stator core 30 in the circumferential direction toward the opposite side of the first engaging wall surface 36 to the distal end of the second slit-side end part 51c. Moreover, the distal end of the second slit-side end part 52c of the second fastening portion 52 is kept in pressed contact with the second engaging wall surface 37 of the recess 35 of the stator core 30 by the springback of the second slit-side end part 52c. Consequently, with the pressed contact between the distal end of the second slit-side end part 52c and the second engaging wall surface 37 of the recess 35, the outer cylinder 50 is prevented from rotating relative to the stator core 30 in the circumferential direction toward the opposite side of the second engaging wall surface 37 to the distal end of the second slit-side end part 52c. As a result, it becomes possible to easily and reliably fasten the outer cylinder 50 and the stator core 30 together without performing a preliminary bending step as disclosed in Japanese Unexamined Patent Application Publication No. 2012-161237.

Moreover, in the present embodiment, each of the first fastening portions 51 of the outer cylinder 50 is located on the stator core 30 so that before the bending of the first fastening portion 51 radially inward (or before the pressing of the second slit-side end part 51c of the first fastening portion 51 into the recess 35), the second slit-side end part 51c of the first fastening portion 51 protrudes circumferentially toward the opposite side to the recess 35 of the stator core 30 by the predetermined amount from the first reference line L1. Moreover, the second fastening portion 52 of the outer cylinder 50 is located on the stator core 30 so that before the bending of the second fastening portion 52 radially inward (or before the pressing of the second slit-side end part 52c of the second fastening portion 52 into the recess 35), the second slit-side end part 52c of the second fastening portion 52 protrudes circumferentially toward the opposite side to the recess 35 of the stator core 30 by the predetermined amount from the second reference line L2.

With the above configuration, the distal end of the second slit-side end part 51c of each of the first fastening portions 51 can be reliably brought into engagement with the first engaging wall surface 36 of the recess 35 of the stator core 30 after the pressing of the second slit-side end part 51c into the recess 35. Moreover, the distal end of the second slit-side end part 52c of the second fastening portion 52 can be reliably brought into engagement with the second engaging wall surface 37 of the recess 35 of the stator core 30 after the pressing of the second slit-side end part 52c into the recess 35.

In the present embodiment, the distal end surfaces of the second slit-side end parts 51c and 52c of the first and second fastening portions 51 and 52 of the outer cylinder 50 are respectively configured as the first oblique surfaces 51d and 52d.

With the above configuration, in the fastening step 104, the second slit-side end parts 51c and 52c of the first and second fastening portions 51 and 52 can be easily and smoothly pressed into the recess 35 of the stator core 30.

In the present embodiment, the recess 35 of the stator core 30 has the first and second engaging wall surfaces 36 and 37 formed respectively at opposite circumferential ends thereof. The outer cylinder 50 has the pair of first fastening portions 51 and the second fastening portion 52. The distal ends of the second slit-side end parts 51c of the first fastening portions 51 engage with the first engaging wall surface 36 of the recess 35 of the outer cylinder 50, while the distal end of the second slit-side end part 52c of the second fastening portion 52 engages with the second engaging wall surface 37 of the recess 35.

Consequently, with the engagement between the distal ends of the second slit-side end parts 51c and 52c of the first and second fastening portions 51 and 52 and the first and second engaging wall surfaces 36 and 37 of the recess 35, the outer cylinder 50 is prevented from rotating relative to the stator core 30 in either of opposite circumferential directions of the stator core 30 (or in either the clockwise or the counterclockwise direction). Accordingly, the stator 20 according to the present embodiment is particularly suitable for use in the case where the rotating electric machine 1 is configured as a motor-generator; the motor-generator selectively functions either as an electric motor or as an electric generator and thus torque transmission in the motor-generator is made selectively in either of opposite circumferential directions of the stator core 30.

In the present embodiment, the recess 35 is formed in only one of the stator core segments 32. In other words, both the first and second engaging wall surfaces 36 and 37 are formed in the same stator core segment 32.

With the above configuration, the recess 35 is formed in the minimum number (i.e., 1) of the stator core segments 32. Consequently, it is possible to minimize undesirable effects of the recess 35 on the magnetic circuit formed in the stator core 30 during operation of the rotating electric machine 1.

While the above particular embodiment has been shown and described, it will be understood by those skilled in the art that various modifications, changes, and improvements may be made without departing from the spirit of the present invention.

For example, in the previous embodiment, the distal end surfaces of the second slit-side end parts 51c and 52c of the first and second fastening portions 51 and 52 of the outer cylinder 50 are respectively configured as the first oblique surfaces 51d and 52d.

However, the distal end surfaces of the second slit-side end parts 51c and 52c of the first and second fastening portions 51 and 52 may be configured in other manners as will be illustrated in the following first to fifth modifications.

In addition, for the sake of avoiding redundancy, in the first to the fifth modifications, only one of the first fastening portions 51 of the outer cylinder 50 will be described. However, it should be noted that the second fastening portion 52 of the outer cylinder 50 may be configured in the same manners as the first fastening portions 51. Moreover, for the sake of simplicity, the stator core 30 and thus the recess 35 formed in the radially outer surface of the stator core 30 are not shown in FIGS. 12-16.

[First Modification]

Figure 12:
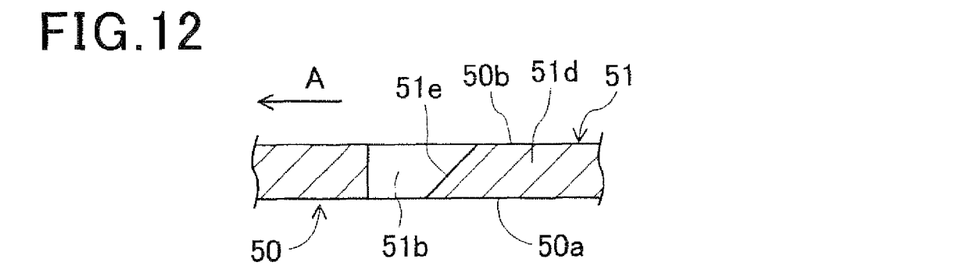
FIG. 12 is a cross-sectional view illustrating the shape of a second slit-side end part of a first fastening portion of an outer cylinder according to a first modification.

As shown in FIG. 12, in the first modification, the distal end surface of the second slit-side end part 51c of the first fastening portion 51 is configured as a second oblique surface 51e. The second oblique surface 51e faces radially outward and circumferentially toward the opposite side to the recess 35 (i.e., toward the side indicated with the arrow A in FIG. 12)

before the pressing of the second slit-side end part 51c of the first fastening portion 51 into the recess 35 (or before the bending of the first fastening portion 51 radially inward). In other words, the distance between the second oblique surface 51e and the recess 35 increases in the radially inward direction (i.e., in the radial direction from the radially outer surface 50b to the radially inner surface 50a of the outer cylinder 50) before the pressing of the second slit-side end part 51c of the first fastening portion 51 into the recess 35.

[Second Modification]

Figure 13:
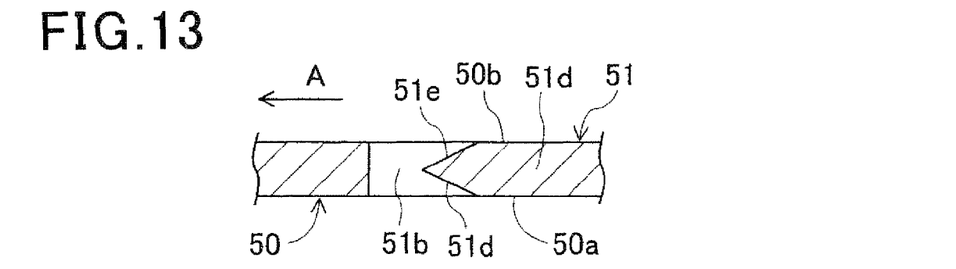
FIG. 13 is a cross-sectional view illustrating the shape of a second slit-side end part of a first fastening portion of an outer cylinder according to a second modification.

As shown in FIG. 13, in the second modification, the second slit-side end part 51c of the first fastening portion 51 is tapered so that the distal end surface of the second slit-side end part 51c includes both a first oblique surface 51d and a second oblique surface 51e. The first oblique surface 51d faces radially inward and circumferentially toward the opposite side to the recess 35 (i.e., toward the side indicated with the arrow A in FIG. 13) before the pressing of the second slit-side end part 51c of the first fastening portion 51 into the recess 35. In other words, the distance between the first oblique surface 51d and the recess 35 increases in the radially outward direction before the pressing of the second slit-side end part 51c of the first fastening portion 51 into the recess 35. On the other hand, the second oblique surface 51e faces radially outward and circumferentially toward the opposite side to the recess 35 (i.e., toward the side indicated with the arrow A in FIG. 13) before the pressing of the second slit-side end part 51c of the first fastening portion 51 into the recess 35. In other words, the distance between the second oblique surface 51e and the recess 35 increases in the radially inward direction before the pressing of the second slit-side end part 51c of the first fastening portion 51 into the recess 35.

[Third Modification]

Figure 14:
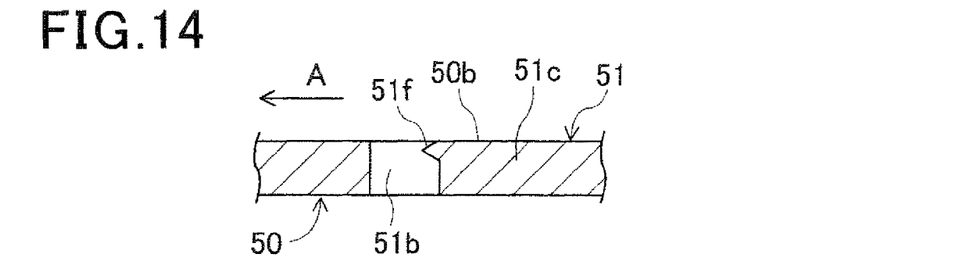
FIG. 14 is a cross-sectional view illustrating the shape of a second slit-side end part of a first fastening portion of an outer cylinder according to a third modification.

As shown in FIG. 14, in the third modification, on the distal end surface of the second slit-side end part 51c of the first fastening portion 51, there is formed a protrusion 51f that protrudes circumferentially toward the opposite side to the recess 35 (i.e., toward the side indicated with the arrow A in FIG. 14) before the pressing of the second slit-side end part 51c of the first fastening portion 51 into the recess 35. Moreover, the protrusion 51f extends in the axial direction of the outer cylinder 50 and has a triangular cross section perpendicular to the axial direction.

In addition, in the present modification, the protrusion 51f is formed at the radially outer end (i.e., the radially outer surface 50b-side end) of the distal end surface of the second slit-side end part 51c of the first fastening portion 51. However, it should be noted that the protrusion 51f may also be formed at any other suitable position than the radially outer end.

[Fourth Modification]

Figure 15:
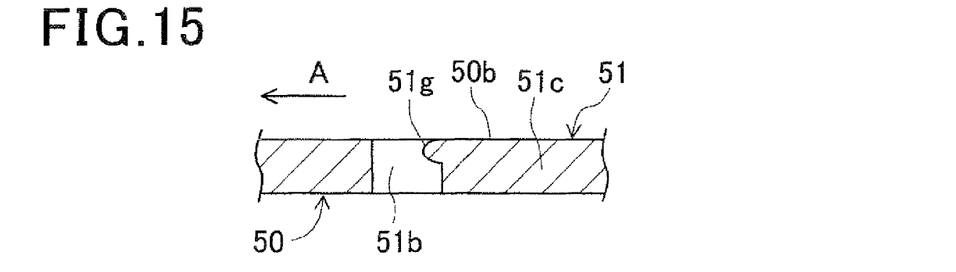
FIG. 15 is a cross-sectional view illustrating the shape of a second slit-side end part of a first fastening portion of an outer cylinder according to a fourth modification.

As shown in FIG. 15, in the fourth modification, on the distal end surface of the second slit-side end part 51c of the first fastening portion 51, there is formed a protrusion 51g that protrudes circumferentially toward the opposite side to the recess 35 (i.e., toward the side indicated with the arrow A in FIG. 15) before the pressing of the second slit-side end part 51c of the first fastening portion 51 into the recess 35. Moreover, the protrusion 51g extends in the axial direction of the outer cylinder 50 and has a semicircular cross section perpendicular to the axial direction.

In addition, in the present modification, the protrusion 51g is formed at the radially outer end (i.e., the radially outer surface 50b-side end) of the distal end surface of the second slit-side end part 51c of the first fastening portion 51. However, it should be noted that the protrusion 51g may also be formed at any other suitable position than the radially outer end.

[Fifth Modification]

Figure 16:
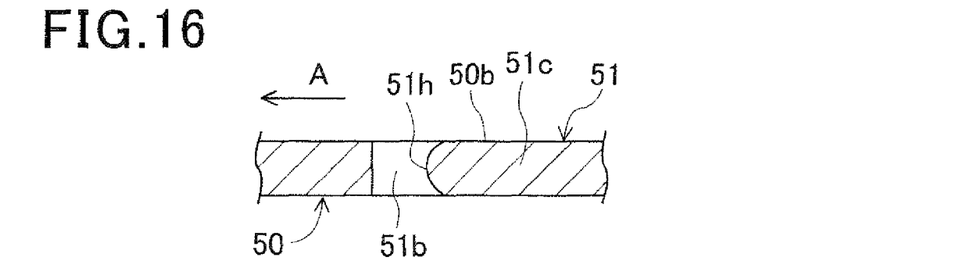
FIG. 16 is a cross-sectional view illustrating the shape of a second slit-side end part of a first fastening portion of an outer cylinder according to a fifth modification.

As shown in FIG. 16, in the fifth modification, the distal end surface of the second slit-side end part 51c of the first fastening portion 51 is configured as a convex surface 51h that protrudes circumferentially toward the opposite side to the recess 35 (i.e., toward the side indicated with the arrow A in FIG. 16) before the pressing of the second slit-side end part 51c of the first fastening portion 51 into the recess 35. Moreover, the convex surface 51h has a semicircular shape on a cross section of the first fastening portion 51 which is perpendicular to the axial direction of the outer cylinder 50.

Furthermore, in the previous embodiment, the outer cylinder 50 has the pair of first fastening portions 51 for engaging with the first engaging wall surface 36 of the recess 35 of the stator core 30 and the second fastening portion 52 for engaging with the second engaging wall surface 37 of the recess 35. The first and second fastening portions 51 and 52 are arranged so that all of them are axially aligned with each other and the second fastening portion 52 is interposed between the first fastening portions 51 (see FIGS. 2-4).

However, as will be illustrated in the following sixth to ninth modifications, the outer cylinder 50 may have different numbers and arrangements of the first and second fastening portions 51 and 52.

[Sixth Modification]

Figure 17:
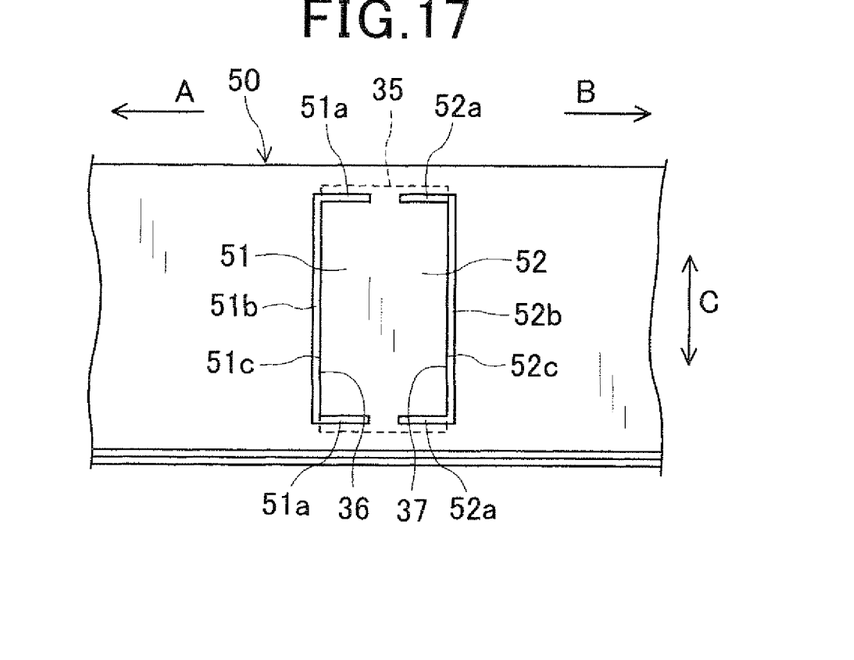
FIG. 17 is a circumferential development view illustrating the arrangement of first and second fastening portions of an outer cylinder according to a sixth modification.

As shown in FIG. 17, in the sixth modification, the outer cylinder 50 has one first fastening portion 51 for engaging with the first engaging wall surface 36 of the recess 35 of the stator core 30 and one second fastening portion 52 for engaging with the second engaging wall surface 37 of the recess 35.

The first fastening portion 51 is formed to be partially surrounded by a substantially U-shaped slit that is comprised of a pair of first slits 51a and a second slit 51b. The first slits 51a both extend in the circumferential direction (i.e., the direction indicated with the single-headed arrows A and B in FIG. 17) of the outer cylinder 50 and are spaced from each other in the axial direction (i.e., the direction indicated with the double-headed arrow C in FIG. 17). The second slit 51b extends in the axial direction of the outer cylinder 50 to connect ends of the first slits 51a on a first circumferential side (i.e., the left side in FIG. 17).

Similarly, the second fastening portion 52 is formed to be partially surrounded by a substantially U-shaped slit that is comprised of a pair of first slits 52a and a second slit 52b. The first slits 52a both extend in the circumferential direction of the outer cylinder 50 and are spaced from each other in the axial direction. The second slit 52b extends in the axial direction of the outer cylinder 50 to connect ends of the first slits 52a on a second circumferential side (i.e., the right side in FIG. 17) which is opposite to the first circumferential side.

Moreover, in the present modification, both the first and second fastening portions 51 and 52 are formed over almost the entire axial length of the outer cylinder 50. Further, the first and second fastening portions 51 and 52 are arranged so that the distal ends of the second slit-side end parts 51c and 52c of the first and second fastening portions 51 and 52 respectively face toward opposite circumferential sides (i.e., the sides indicated with the arrows A and B in FIG. 17).

In addition, in the present modification, only one of the stator core segments 32 has the recess 35 formed in the radially outer surface thereof. That is, both the first and second engaging wall surfaces 36 and 37 are formed in the same stator core segment 32 as in the previous embodiment.

[Seventh Modification]

Figure 18:
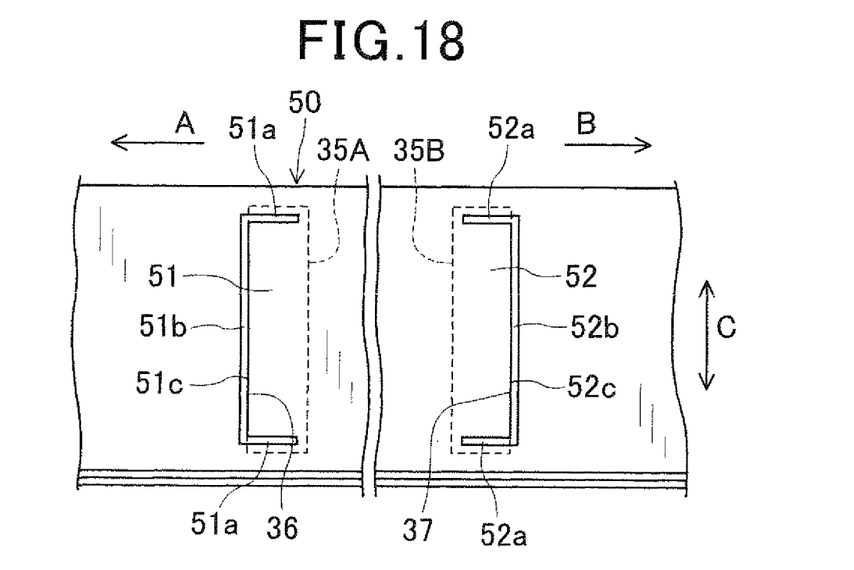
FIG. 18 is a circumferential development view illustrating the arrangement of first and second fastening portions of an outer cylinder according to a seventh modification.

As shown in FIG. 18, in the seventh modification, the outer cylinder 50 has one first fastening portion 51 and one second fastening portion 52.

The first fastening portion 51 is formed to be partially surrounded by a substantially U-shaped slit that is comprised of a pair of first slits 51a and a second slit 51b. The first slits 51a both extend in the circumferential direction (i.e., the direction indicated with the single-headed arrows A and B in FIG. 18) of the outer cylinder 50 and are spaced from each other in the axial direction (i.e., the direction indicated with the double-headed arrow C in FIG. 18). The second slit 51b extends in the axial direction of the outer cylinder 50 to connect ends of the first slits 51a on a first circumferential side (i.e., the left side in FIG. 18).

Similarly, the second fastening portion 52 is formed to be partially surrounded by a substantially U-shaped slit that is comprised of a pair of first slits 52a and a second slit 52b. The first slits 52a both extend in the circumferential direction of the outer cylinder 50 and are spaced from each other in the axial direction. The second slit 52b extends in the axial direction of the outer cylinder 50 to connect ends of the first slits 52a on a second circumferential side (i.e., the right side in FIG. 18) which is opposite to the first circumferential side.

Moreover, in the present modification, both the first and second fastening portions 51 and 52 are formed over almost the entire axial length of the outer cylinder 50. Further, the first and second fastening portions 51 and 52 are arranged so that the distal ends of the second slit-side end parts 51c and 52c of the first and second fastening portions 51 and 52 respectively face toward opposite circumferential sides (i.e., the sides indicated with the arrows A and B in FIG. 18).

Furthermore, in the present modification, the first and second fastening portions 51 and 52 are spaced from each other in the circumferential direction of the outer cylinder 50 by a predetermined distance. On the other hand, two of the stator core segments 32 respectively have first and second recesses 35A and 35B formed therein. The first recess 35A has a first engaging wall surface 36 formed at the first circumferential end (i.e., the left end in FIG. 18) thereof for engaging with a second slit-side end part 51c of the first fastening portion 51 of the outer cylinder 50. The second recess 35B has a second engaging wall surface 37 formed at the second circumferential end (i.e., the right end in FIG. 18) thereof for engaging with a second slit-side end part 52c of the second fastening portion 52 of the outer cylinder 50. That is, in the present modification, the first and second engaging wall surfaces 36 and 37 are respectively formed in two different ones of the stator core segments 32.

With the above configuration, the circumferential width of each of the first and second recesses 35A and 35B can be set so small as to be half the circumferential width of the single recess 35 in the sixth modification. Consequently, it is possible to suppress undesirable effects of the recesses 35A and 35B on the magnetic circuit formed in the stator core 30 during operation of the rotating electric machine 1.

[Eighth Modification]

Figure 19:
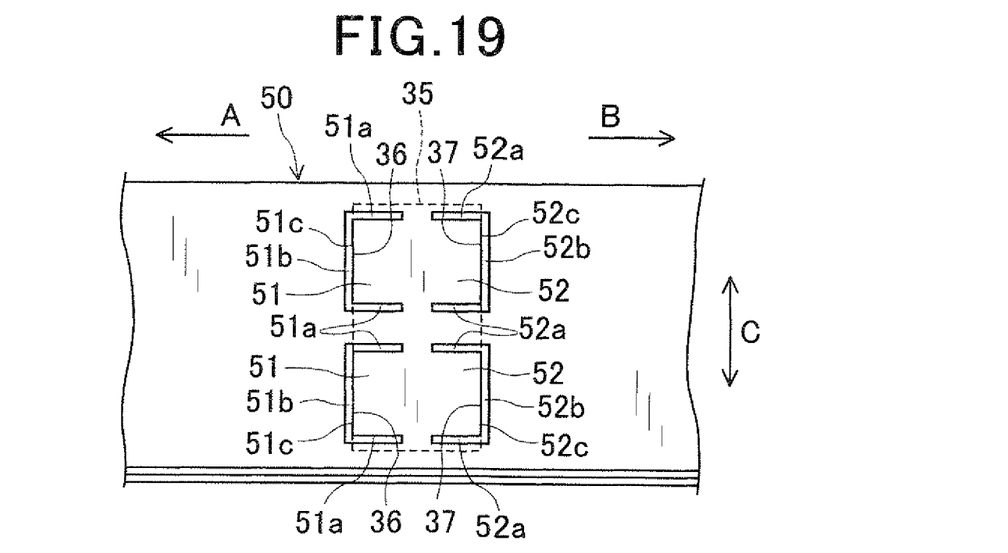
FIG. 19 is a circumferential development view illustrating the arrangement of first and second fastening portions of an outer cylinder according to an eighth modification.

As shown in FIG. 19, in the eighth modification, the outer cylinder 50 has a pair of first fastening portions 51 and a pair of second fastening portions 52.

Each of the first fastening portions 51 is formed to be partially surrounded by a substantially U-shaped slit that is comprised of a pair of first slits 51a and a second slit 51b. The first slits 51a both extend in the circumferential direction (i.e., the direction indicated with the single-headed arrows A and B in FIG. 19) of the outer cylinder 50 and are spaced from each other in the axial direction (i.e., the direction indicated with the double-headed arrow C in FIG. 19). The second slit 51b extends in the axial direction of the outer cylinder 50 to connect ends of the first slits 51a on a first circumferential side (i.e., the left side in FIG. 19).

Moreover, the first fastening portions 51 are aligned with each other in the axial direction of the outer cylinder 50 and have an axial length that is almost half the axial length of the single first fastening portion 51 in the sixth modification.

Similarly, each of the second fastening portions 52 is formed to be partially surrounded by a substantially U-shaped slit that is comprised of a pair of first slits 52a and a second slit 52b. The first slits 52a both extend in the circumferential direction of the outer cylinder 50 and are spaced from each other in the axial direction. The second slit 52b extends in the axial direction of the outer cylinder 50 to connect ends of the first slits 52a on a second circumferential side (i.e., the right side in FIG. 19) which is opposite to the first circumferential side.

Moreover, the second fastening portions 52 are aligned with each other in the axial direction of the outer cylinder 50 and have an axial length that is almost half the axial length of the single second fastening portion 52 in the sixth modification.

Furthermore, in the present modification, the first and second fastening portions 51 and 52 are arranged so that the second slit-side end parts 51c of the first fastening portions 51 face toward the first circumferential side, whereas the second slit-side end parts 52c of the second fastening portions 52 face toward the second circumferential side.

In addition, in the present modification, only one of the stator core segments 32 has the recess 35 formed in the radially outer surface thereof. That is, both the first and second engaging wall surfaces 36 and 37 are formed in the same stator core segment 32 as in the sixth modification.

[Ninth Modification]

Figure 20:
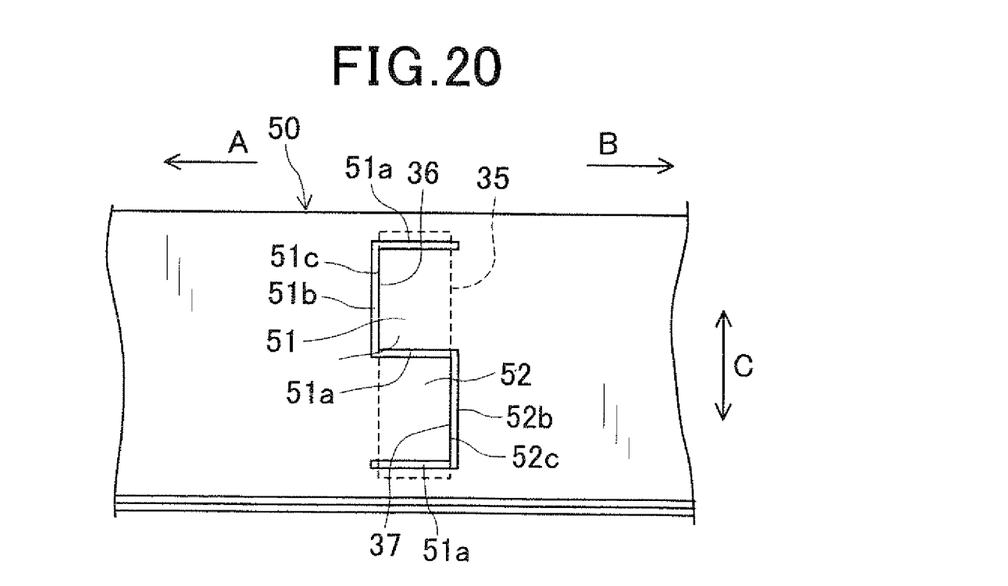
FIG. 20 is a circumferential development view illustrating the arrangement of first and second fastening portions of an outer cylinder according to a ninth modification.

As shown in FIG. 20, in the ninth modification, the outer cylinder 50 has one first fastening portion 51 and one second fastening portion 52.

The first and second fastening portions 51 and 52 are formed in pair so as to be partially surrounded by a substantially S-shaped slit that is comprised of three first slits 51a and two second slit 51b. All of the three first slits 51a extend in the circumferential direction (i.e., the direction indicated with the single-headed arrows A and B in FIG. 20) of the outer cylinder 50 and are spaced from one another in the axial direction (i.e., the direction indicated with the double-headed arrow C in FIG. 20). One of the second slits 51b extends in the axial direction of the outer cylinder 50 to connect two of the three first slits 51a, which are respectively positioned at the axial center and one axial end of the substantially S-shaped slit, on a first circumferential side (i.e., the left side in FIG. 20). The other second slit 51b extends in the axial direction of the outer cylinder 50 to connect two of the three first slits 51a, which are respectively positioned at the axial center and the other axial end of the substantially S-shaped slit, on a second circumferential side (i.e., the right side in FIG. 20).

With the above configuration, the first and second fastening portions 51 and 52 are aligned with each other in the axial direction of the outer cylinder 50. Consequently, it becomes possible to minimize the circumferential width of the recess 35 which has the first and second engaging wall surfaces 36 and 37 for respectively engaging with the first and second fastening portions 51 and 52. As a result, with the minimized circumferential width of the recess 35, it is possible to minimize undesirable effects of the recess 35 on the magnetic circuit formed in the stator core 30 during operation of the rotating electric machine 1.

In the previous embodiment and the first to the fifth modifications, only one recess 35 or one pair of first and second recesses 35A and 35B is formed in the stator core 30. However, it is also possible to form a plurality of recesses 35 or a plurality of pairs of first and second recesses 35A and 35B in the stator core 30.

Furthermore, it is also possible to: configure each of the stator core segments 32 to have one recess 35 formed therein; and configure the outer cylinder 50 to have a plurality of sets of first and second fastening portions 36 and 37 formed therein, each set of the first and second fastening portions 36 and 37 engaging with a corresponding one of the recesses 35 formed in the stator core segments 32. In this case, it is possible to reliably prevent each of the stator core segments 32 from rotating relative to the outer cylinder 50 when micro vibration is transmitted to the stator 20.

What is claimed is:

1. A stator for a rotating electric machine, the stator comprising:
    a hollow cylindrical stator core comprised of a plurality of stator core segments that are arranged in a circumferential direction of the stator core to adjoin one another in the circumferential direction;
    a stator coil mounted on the stator core; and
    an outer cylinder fitted on a radially outer surface of the stator core,
    wherein
    the stator core has a recess formed in the radially outer surface thereof, the recess having an engaging wall surface that extends in both an axial direction and a radial direction of the stator core,
    the outer cylinder has a plurality of first slits and a second slit, all of which radially penetrate the outer cylinder to connect radially outer and inner surfaces of the outer cylinder,
    the first slits extend in the circumferential direction of the stator core and are spaced from one another in the axial direction of the stator core,
    the second slit extends in the axial direction of the stator core to connect the first slits,
    the outer cylinder also has a fastening portion for fastening the outer cylinder to the stator core, the fastening portion being formed to be partially surrounded by the first and second slits,
    the fastening portion is bent radially inward to have a second slit-side end part thereof received in the recess of the stator core, and
    the second slit-side end part of the fastening portion has a distal end engaging with the engaging wall surface of the recess of the stator core.

2. The stator as set forth in claim 1, wherein the fastening portion is located on the stator core so that before the bending of the fastening portion radially inward, the second slit-side end part of the fastening portion protrudes circumferentially toward the opposite side to the recess of the stator core by a predetermined amount from a reference line, the reference line being defined to extend through both a longitudinal axis of the stator core and an intersection between the radially outer surface of the stator core and the engaging wall surface of the recess.

3. The stator as set forth in claim 1, wherein on a distal end surface of the second slit-side end part of the fastening portion, there is formed a protrusion that protrudes circumferentially toward the opposite side to the recess of the stator core before the bending of the fastening portion radially inward.

4. The stator as set forth in claim 1, wherein a distal end surface of the second slit-side end part of the fastening portion is configured to include at least one of first and second oblique surfaces,
    the first oblique surface faces radially inward and circumferentially toward the opposite side to the recess of the stator core before the bending of the fastening portion radially inward, and
    the second oblique surface faces radially outward and circumferentially toward the opposite side to the recess of the stator core before the bending of the fastening portion radially inward.

5. The stator as set forth in claim 1, wherein the fastening portion of the outer cylinder is a first fastening portion and the engaging wall surface is a first engaging wall surface that engages with the distal end of the second slit-side end part of the first fastening portion,
    the outer cylinder also has a second fastening portion for fastening the outer cylinder to the stator core, the second fastening portion being formed in a same manner as the first fastening portion to have a second slit-side end part with a distal end, the distal ends of the second slit-side end parts of the first and second fastening portions facing respectively toward opposite circumferential sides, and
    in the stator core, there is also formed a second engaging wall surface in a same manner as the first engaging wall surface, the second engaging wall surface engaging with the distal end of the second slit-side end part of the second fastening portion of the outer cylinder.

6. The stator as set forth in claim 5, wherein both the first and second engaging wall surfaces are formed in a same one of the stator core segments.

7. The stator as set forth in claim 5, wherein the first and second engaging wall surfaces are formed respectively in two different ones of the stator core segments.

8. The stator as set forth in claim 1, wherein the distal end of the second slit-side end part of the fastening portion of the outer cylinder is kept in pressed contact with the engaging wall surface of the recess of the stator core by springback of the second slit-side end part.

9. The stator as set forth in claim 1, wherein the engaging wall surface of the recess of the stator core is positioned closer to the distal end of the second slit-side end part of the fastening portion of the outer cylinder than to a bending start point of the fastening portion.

* * * * *